United States Patent
Ishihara et al.

(10) Patent No.: US 10,399,888 B2
(45) Date of Patent: Sep. 3, 2019

(54) METHOD FOR PRODUCING GLASS PARTICULATE DEPOSIT AND METHOD FOR PRODUCING GLASS PREFORM

(71) Applicant: SUMITOMO ELECTRIC INDUSTRIES, LTD., Osaka-shi, Osaka (JP)

(72) Inventors: Tomohiro Ishihara, Yokohama (JP); Takashi Yamazaki, Yokohama (JP)

(73) Assignee: SUMITOMO ELECTRIC INDUSTRIES, LTD., Osaka-shi, Osaka (JP)

(*) Notice: Subject to any disclaimer, the term of this patent is extended or adjusted under 35 U.S.C. 154(b) by 0 days.

(21) Appl. No.: 14/567,142

(22) Filed: Dec. 11, 2014

(65) Prior Publication Data

US 2015/0166399 A1   Jun. 18, 2015

(30) Foreign Application Priority Data

Dec. 12, 2013   (JP) .................................. 2013-256825

(51) Int. Cl.
*C03B 37/014* (2006.01)

(52) U.S. Cl.
CPC ...... *C03B 37/0142* (2013.01); *C03B 2207/02* (2013.01); *C03B 2207/06* (2013.01);
(Continued)

(58) Field of Classification Search
CPC .......... C03B 37/0142; C03B 37/10433; C03B 2207/20; C03B 2207/26; C03B 2207/28; C03B 2207/02
See application file for complete search history.

(56) References Cited

U.S. PATENT DOCUMENTS

| 4,810,189 A * | 3/1989 | Mikami .............. C03B 37/0142 431/349 |
| 5,922,100 A | 7/1999 | Cain et al. |

(Continued)

FOREIGN PATENT DOCUMENTS

| JP | H11-510778 A | 9/1999 |
| JP | 2002167223 A * | 6/2002 |

(Continued)

OTHER PUBLICATIONS

JP 2002-167223 A (Kawase). Jun. 11, 2002 (English language machine translation). [online] [retrieved Dec. 21, 2016]. Retrieved from: Espacenet.*

(Continued)

*Primary Examiner* — Erin Snelting
(74) *Attorney, Agent, or Firm* — Drinker Biddle & Reath LLP (57) ABSTRACT

The invention provides a production method for a glass particulate deposit M which includes a deposition step where a starting rod 111 and a burner 222 for production of glass particles 130 are installed in a reactor 102, a glass source material is introduced into the burner 222, the glass source material is subjected to flame thermal decomposition in the flame formed by the burner 222 to thereby form glass particles 130, and the formed glass particles 130 are deposited on the starting rod 111 to produce a glass particulate deposit M. In the deposition step of the production method, at least two ejecting ports 231 are provided per one burner 222 for ejecting the glass source material from the burner 222, and a flow rate of the glass source material jetting out through one glass source material ejecting port 231 is from 4 m/s to 60 m/s.

12 Claims, 5 Drawing Sheets

(52) U.S. Cl.
CPC ...... *C03B 2207/12* (2013.01); *C03B 2207/22* (2013.01); *C03B 2207/26* (2013.01); *C03B 2207/32* (2013.01); *C03B 2207/34* (2013.01); *Y02P 40/57* (2015.11)

(56) References Cited

U.S. PATENT DOCUMENTS

| | | | |
|---|---|---|---|
| 6,743,011 B2 | 6/2004 | Bakshi et al. | |
| 2004/0261460 A1* | 12/2004 | Roba | C03B 19/1423 65/413 |
| 2009/0211301 A1* | 8/2009 | Yoshida | C03B 37/0142 65/421 |
| 2010/0143601 A1* | 6/2010 | Hawtof | F23D 14/08 427/446 |

FOREIGN PATENT DOCUMENTS

| | | | | |
|---|---|---|---|---|
| JP | T-2010-526978 | | 8/2010 | |
| JP | 2012001411 A | * | 1/2012 | ......... C03B 37/0142 |
| WO | WO 2008/121271 A1 | | 10/2008 | |

OTHER PUBLICATIONS

JP 2012-001411 A (Arai et al.) Jan. 5, 2012 (English language machine translation). [online] [retrieved Dec. 21, 2016]. Retrieved from: Espacenet.*

* cited by examiner

METHOD FOR PRODUCING GLASS PARTICULATE DEPOSIT AND METHOD FOR PRODUCING GLASS PREFORM

This application claims priority from Japanese Patent Application No. 2013-256825, filed on Dec. 12, 2013, the entire contents of which are hereby incorporated by reference.

FIELD OF THE INVENTION

The present invention relates to a method for producing a glass particulate deposit by depositing glass particles on a starting rod according to an OVD process (outside vapor deposition process), a VAD process (vapor phase axial deposition process), an MMD process (multiburner multi-layer deposition process) or the like, and to a method for producing a glass preform by heating and vitrifying the glass particulate deposit.

DESCRIPTION OF THE RELATED ART

Heretofore, as a method for producing a glass preform, there is known a production method including a deposition step of forming a glass particulate deposit according to an OVD process, a VAD process or the like, and a vitrification step of forming a transparent glass preform by heating the glass particulate deposit.

For example, there is disclosed a precision burner for oxidizing a silicon-containing compound not containing a halide, such as octamethylcyclotetrasiloxane (OMCTS) or the like, which is used in forming a glass preform in JP-T-H 11-510778. There is disclosed a linear burner for hydrolysis or oxidation of $SiCl_4$ or $GeCl_4$ or a silicon-containing compound such as OMCTS or the like in U.S. Pat. No. 6,743, 011.

However, the burners disclosed in JP-T 11-510778 and U.S. Pat. No. 6,743,011 have a problem to be solved in that the glass source material yield must be increased in producing the glass particulate deposit by depositing the glass particles formed in the flame generated by the burner, on the starting rod.

SUMMARY OF THE INVENTION

The present invention also provides a production method for a glass particulate deposit as another embodiment capable of solving the above-mentioned problems. The production method for a glass particulate deposit includes a deposition step where a starting rod and a burner for production of glass particles are installed in a reactor, a glass source material is introduced into the burner, the glass source material is subjected to flame thermal decomposition in the flame formed by the burner to thereby form glass particles, and the formed glass particles are deposited on the starting rod to produce a glass particulate deposit. In the deposition step, at least two ejecting ports are provided per one burner for ejecting the glass source material from the burner, and the flow rate of the glass source material jetting out through one glass source material ejecting port is from 4 m/s to 60 m/s.

The invention also provides a production method for a glass preform as another embodiment capable of solving the above-mentioned problems. The production method for a glass preform includes a vitrification step where a glass particulate deposit is produced according to any of the above-mentioned production methods for a glass particulate deposit, and the thus-produced glass particulate deposit is heated to give a transparent glass preform.

According to the production method for a glass particulate deposit and the production method for a glass preform of the present invention, it is possible to increase the glass source material yield for the produced glass particulate deposit.

DETAILED DESCRIPTION OF EXEMPLARY EMBODIMENTS

First described are the contents of the embodiments of the present invention in turn. One example of an embodiment of the production method for a glass particulate deposit of the present invention has any of the characteristic features (1) to (11) mentioned below.

(1) A production method for a glass particulate deposit which includes a deposition step where a starting rod and a burner for production of glass particles are installed in a reactor, a glass source material is introduced into the burner, the glass source material is subjected to flame thermal decomposition in the flame formed by the burner to thereby form glass particles, and the formed glass particles are deposited on the starting rod to produce a glass particulate deposit. In the deposition step of the production method, at least two ejecting ports are provided per one burner for ejecting the glass source material from the burner, and a flow rate of the glass source material jetting out through one glass source material ejecting port is from 4 m/s to 60 m/s.

According to the production method for a glass particulate deposit having the characteristic feature, it is possible to suitably diffuse the glass source material jetting out through each ejecting port of the burner for formation of glass particles and is also possible to promote the stirring of the glass source material and the gas forming the flame to thereby enhance the glass source material yield.

(2) Preferably, in the deposition step in the production method for a glass particulate deposit having the above-mentioned characteristic feature (1), three or more ejecting ports are provided per one burner.

(3) Also preferably, in the deposition step in the production method for a glass particulate deposit having the above-mentioned characteristic feature (1), five or more ejecting ports are provided per one burner.

(4) Also preferably, in the deposition step in the production method for a glass particulate deposit having any of the above-mentioned characteristic features (1) to (3), the flow rate of the glass source material jetting out through one glass source material ejecting port is from 10 m/s to 40 m/s.

(5) Also preferably, in the deposition step in the production method for a glass particulate deposit having any of the above-mentioned characteristic features (1) to (3), the flow rate of the glass source material jetting out through one glass source material ejecting port is from 15 m/s to 30 m/s.

(6) Also preferably, in the deposition step in the production method for a glass particulate deposit having any of the above-mentioned characteristic features (1) to (3), the glass source material is supplied to each ejecting port in the form of a vapor thereof.

(7) Also preferably, in the deposition step in the production method for a glass particulate deposit having any of the above-mentioned characteristic features (1) to (3), the glass source material is made to be a vapor thereof, and the vapor-state glass source material is mixed with an inert gas and supplied to each ejecting port.

(8) Also preferably, in the deposition step in the production method for a glass particulate deposit having any of the above-mentioned characteristic features (1) to (7), the glass source material to be supplied to the burner is siloxane.

According to this constitution, it is possible to reduce the production cost for the glass particulate deposit without generating any harmful substance such as HCl or the like in formation of glass particles.

(9) Also preferably, in the deposition step in the production method for a glass particulate deposit having the any of above-mentioned characteristic features (1) to (8), the glass source material to be supplied to the burner is octamethylcyclotetrasiloxane (OMCTS).

One example of an embodiment of the production method for a glass preform of the present invention has the characteristic feature (10) or (11) mentioned below.

(10) A production method for a glass preform which includes:

a vitrification step where a glass particulate deposit is produced according to any of the above-mentioned production methods (1) to (9) for a glass particulate deposit, and the thus-produced glass particulate deposit is heated to give a transparent glass preform.

According to this constitution, there can be provided a production method for a glass preform capable of improving the glass source material yield for the glass particulate deposit.

(11) Preferably, in the production method for a glass preform of the above (10), the deposition of the glass particles on the starting rod in the deposition step is implemented according to any of an OVD process, a VAD process or an MMD process.

DETAILED DESCRIPTION OF EMBODIMENTS OF THE INVENTION

Examples of embodiments of the production method for a glass particulate deposit and the production method for a glass preform of the present invention are described in detail with reference to FIG. 1 to FIG. 4. In the following description, there are exemplified cases of using an OVD (outside vapor deposition) process for the production method for a glass particulate deposit. However, the process employable for the production method for a glass particulate deposit in the embodiments to be described below is not limited to such an OVD process. Herein employable are any other processes of, for example, a VAD (vapor phase axial deposition) process, an MMD (multiburner multilayer deposition) process or the like in which glass can be deposited through flame thermal decomposition of a glass source material, like in an OVD process.

Figure 1:
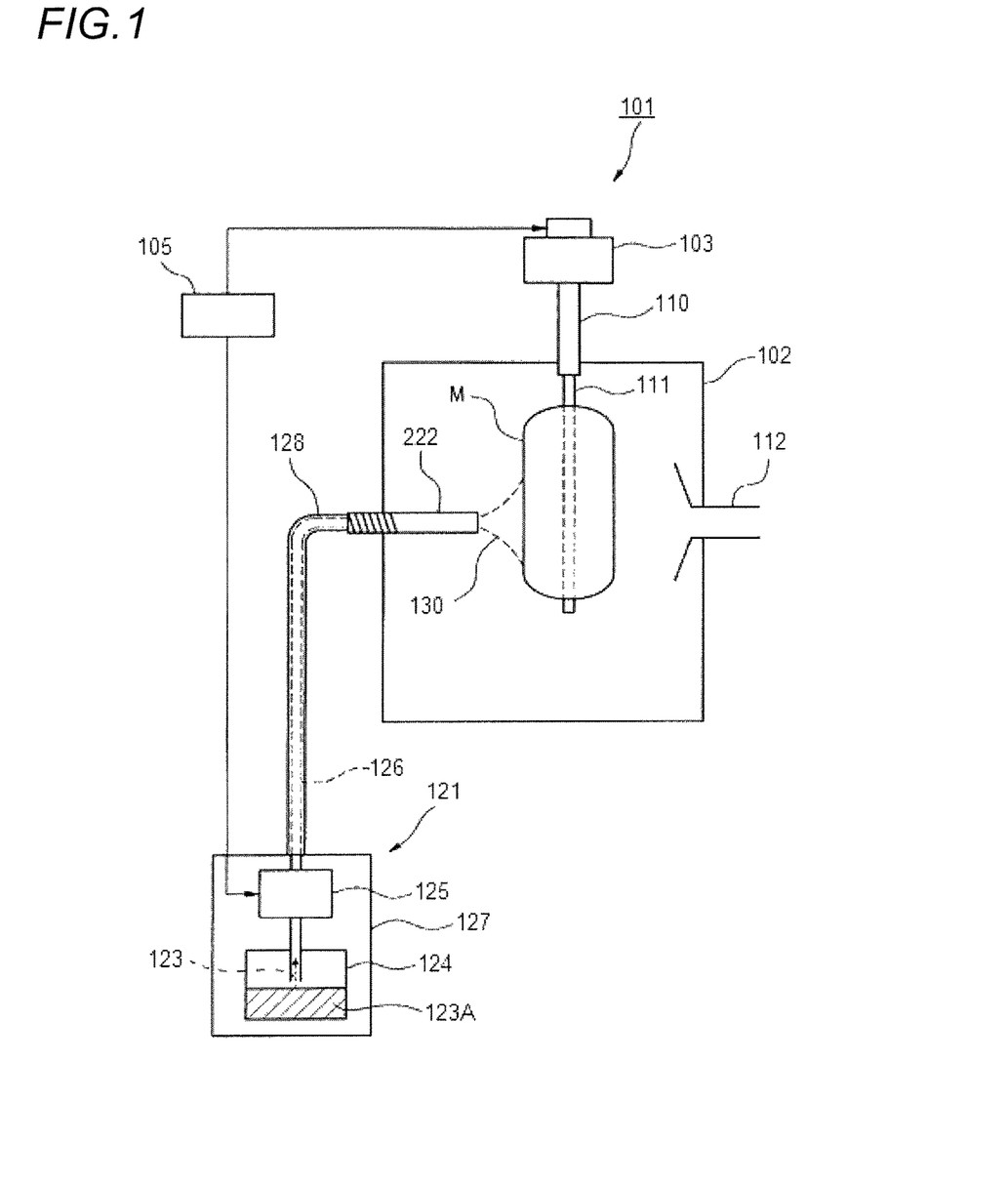
FIG. 1 is a configuration view showing a production apparatus for implementing the production method for a glass particulate deposit of another example of an embodiment of the present invention.

FIG. 1 is a configuration view of a production apparatus 101 for implementing the production method for a glass particulate deposit of another embodiment of the present invention. The production apparatus 101 comprises a reactor 102, an elevating revolver 103, a source material supplier 121, a burner 222 for formation of glass particles, and a controller 105 for controlling the movement of each member.

The reactor 102 is a container in which a glass particulate deposit M is formed, and this has an exhaust pipe 112 formed through the side wall thereof.

The elevating revolver 103 is a device for lifting and lowering and rotating the glass particulate deposit M via a supporting rod 110 and a starting rod 111. The elevating revolver 103 moves up and down and rotates the glass particulate deposit M based on the control signal sent from the controller 105.

The supporting rod 110 is arranged to run through the through-hole formed in the top wall of the reactor 102, and the starting rod 111 is fitted onto one end thereof (lower end in FIG. 1) arranged in the reactor 102. The other end of the supporting rod 110 (upper end in FIG. 1) is held by the elevating revolver 103.

The starting rod 111 is a rod on which glass particles are deposited, and is fitted onto the supporting rod 110.

The exhaust pipe 112 is a pipe through which the glass particles not having adhered to the starting rod 111 and to the glass particulate deposit M are discharged out of the reactor 102.

A liquid source material 123 that has been vaporized in the source material supplier 121 is supplied to the burner 222. In FIG. 1, a gas supplier for supplying a flame forming gas is omitted.

The source material supplier 121 comprises a vaporizer 124 for vaporize the liquid source material 123A, a mass flow controller, MFC 125 for controlling the gas flow rate of the source material gas 123, a supply pipe 126 for leading the source material gas 123 to the burner 222, and a temperature controlling booth 127 for controlling the temperature of the vaporizer 124, MFC 125 and a part of the supply pipe 126.

MFC 125 is a device for supplying the source material gas 123 to be ejected out from the burner 222, to the burner 222 via the supply pipe 126. MFC 125 controls the supply amount of the source material gas 123 to be supplied to the burner 222 based on the control signal sent from the controller 105.

The supply pipe 126 is a pipe for leading the source material gas 123 to the burner 222. For keeping the supply pipe 126 at a high temperature, it is desirable that a tape heater 128 that is a heat generator is wound around the outer periphery of the supply pipe 126 and a part of the outer periphery of the burner 222. When electrified, the tape heater 128 heats the supply pipe 126 and the burner 222, whereby the temperature of the source material gas 123 ejected out through the burner 222 can be elevated up to a temperature suitable for vaporization. For example, when the liquid source material 123A is octamethylcyclotetrasiloxane (OMCTS), then it may be heated up to a temperature higher than the standard boiling point of OMCTS, from 175 to 200° C.

Through the burner 222, the source material gas 123 is subjected to flame thermal decomposition in the flame to give glass particles 130, and the resultant glass particles 130 are jetted out and deposited on the starting rod 111.

The controller 105 controls each movement of the elevating revolver 103, the source material supplier 121, etc. The controller 105 sends a control signal to control the elevating and lowering speed and the rotating speed of the glass particulate deposit M, to the elevating revolver 103. Further, the controller 105 sends a control signal to control the flow rate of the source material gas 123 to be ejected from the burner 222 to the MFC 125 of the source material supplier 121.

As the burner 222 for ejecting the glass source material and the flame forming gas, for example, employable here is one having a cylindrical multinozzle structure or one having a linear multinozzle structure.

Figure 2A:
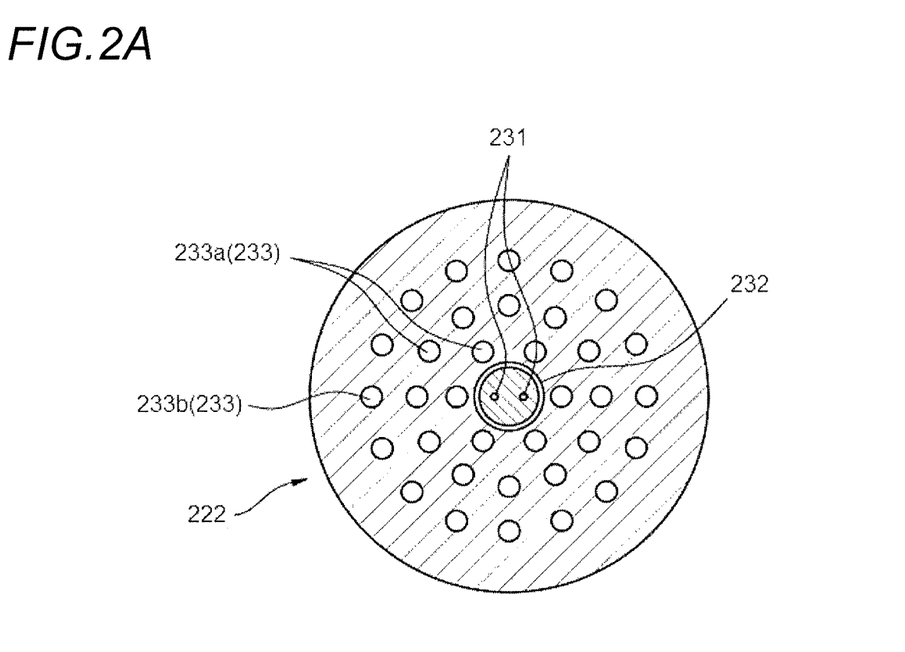
FIG. 2A is a plan view of one example of a burner for producing glass particles in the production apparatus shown in FIG. 1, as seen from the burner top side.

FIG. 2A is a plan view the burner 222, one example of a burner having a multinozzle structure, as seen from the burner top side.

The burner 222 shown in FIG. 2A has a source material port 231 for jetting out the source material gas 123 therethrough, at the center of the burner top. To the source material port 231, for example, a mixed gas of the source material gas 123 and an inert gas such as nitrogen ($N_2$) or the like is supplied. Around the outer periphery of the source material port 231, there is provided a seal gas port 232. Around the seal gas port 232, multiple combustion gas ports 233 for jetting out a combustion gas therethrough are arranged concentrically.

From the source material port 231 at the center, for example, siloxane such as typically OMCTS or the like is jetted out as the source material gas 123. From the seal gas port 232, for example, an inert gas of nitrogen ($N_2$) or argon (Ar) is supplied as a seal gas. From the combustion gas port 233, for example, a combustible gas of hydrogen ($H_2$) is jetted out through the port 233a on the inner side, while a co-combustion gas of oxygen ($O_2$) is jetted out through the port 233b on the outer side.

Figure 2B:
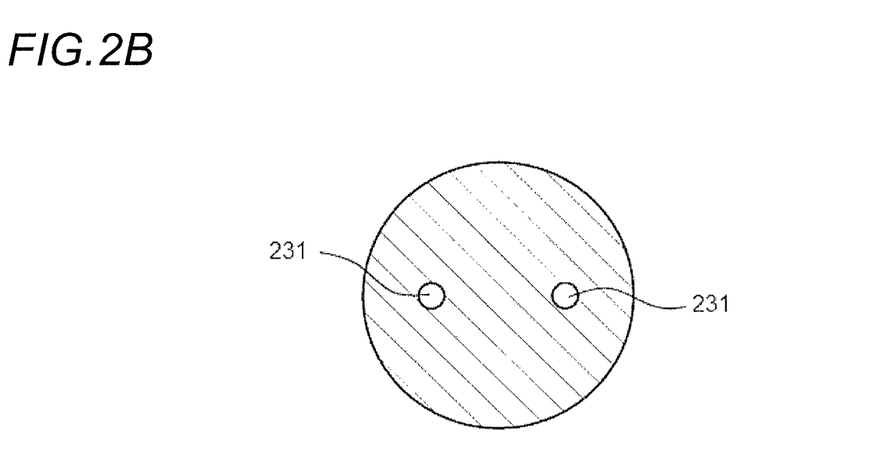
FIG. 2B is an enlarged view near the source material port of the burner top in the plan view of FIG. 2A.

As shown in FIG. 2B, in this embodiment, two source material ports 231 are provided at the center of the burner 222. To each source material port 231, gaseous siloxane is supplied. Two or more such source material ports 231 are provided here, and consequently, the source material gas can be supplied in the burner flame as dispersed therein, and the efficiency of chemical change of the source material gas to $SiO_2$ can be thereby increased. When the number of the jetting ports for the glass source material is larger, then the effect could be higher, and when the number is 3 or more, and further 5 or more, the effect could be further higher. However, when the number is too large, the burner cost would be high.

Next described is a process of the production method for a glass particulate deposit and a glass preform.

[Deposition Step]

Glass particles are deposited according to an OVD process (outside vapor deposition process) to produce the glass particulate deposit M. First, as shown in FIG. 1, the supporting rod 110 is fitted onto the elevating revolver 103, and the starting rod 111 is fitted onto the lower end of the supporting rod 110, and in that condition, the starting rod 111 and a part of the supporting rod 110 are housed in the reactor 102.

Subsequently, via the MFC 125, the source material gas 123 is supplied to the burner 222 while the supply amount thereof is controlled on the basis of the control signal sent from the controller 105.

The source material gas 123, oxyhydrogen gas (flame forming gas) are supplied to the burner 222, and the source material gas 123 is subjected to flame thermal decomposition (oxidation, etc.) in the oxyhydrogen flame to give glass particles 130.

With that, the burner 222 further acts to continuously deposit the glass particles 130 formed in the flame, onto the starting rod 111 that rotates and moves up and down.

The elevating revolver 103 acts to move up and down and rotate the starting rod 111 and the glass particulate deposit M deposited on the starting rod 111, based on the control signal from the controller 105.

[Vitrification Step]

Next, the resultant glass particulate deposit is heated in a mixed atmosphere of an inert gas and a chlorine gas at 1100° C., and then further heated in a He atmosphere at 1550° C. to give a transparent glass preform. The glass preform production is repeated.

As described above, in the deposition step in this embodiment, at least two source material ports 231 per one burner 222 are provided, which are ejecting ports for the glass source material. Providing two or more such source material ports 231 makes it possible to increase the reaction efficiency of chemical change of the source material gas 123 into $SiO_2$.

In addition, in this embodiment, the flow rate (initial flow rate) of the glass source material jetting out through one glass source material ejecting port is from 4 m/s to 60 m/s, more preferably from 10 m/s to 40 m/s, even more preferably from 15 m/s to 30 m/s. In that manner, the source material gas 123 forming a free jet flow can readily expand in the outer peripheral direction of the flame from the center of the flame, and therefore the stirring of the glass source material and oxygen of the flame forming gas is promoted to further accelerate the oxidation of the source material. When the flow rate of the source material gas 123 is lower than 4 m/s, then the effect of the free jet flow would be weakened and the source material gas 123 could hardly expand in the outer peripheral direction of the flame. When the flow rate of the source material gas 123 is more than 60 m/s, then the oxygen gas flowing around the flame would be drawn in the source material gas flow owing to the Venturi effect so that the cross-sectional area of the source material gas flow would be thereby narrowed and the heating density in oxidation of the source material would increase. Accordingly, the flame temperature would be too high and the density of the glass particulate deposit to be formed would increase and the glass particulate deposit could hardly grow.

In this embodiment, as the liquid source material gas 123, a siloxane that is a halogen-free source material is used, and preferably OMCTS is used. $SiCl_4$ that has heretofore been used as a glass source material forms $SiO_2$ glass particles according to the following formula (1).

$$SiCl_4 + 2H_2O \rightarrow SiO_2 + 4HCl \qquad \text{Formula (1)}$$

In this case, HCl (hydrochloric acid) having a bad influence on the environment and human bodies is formed as a side product, and therefore the process requires a treatment device for detoxifying hydrochloric acid, or that is, the running cost in production of the glass preform according to the process is extremely high.

On the other hand, like in this embodiment, when a siloxane liquid such as typically OMCTS or the like is used, $SiO_2$ glass particles are formed according to the following formula (2).

$$[SiO(CH_3)_2]_4 + 16O_2 \rightarrow 4SiO_2 + 8CO_2 + 12H_2O \qquad \text{Formula (2)}$$

As in the above, when a siloxane, more preferably OMCTS is used as the glass source material to be supplied to the burner, then any harmful substance such as hydrochloric acid is not discharged. Consequently, the process does not require any treatment device for removing or detoxifying such a harmful substance, and the production cost for the glass preform can be therefore reduced.

Figure 3A:
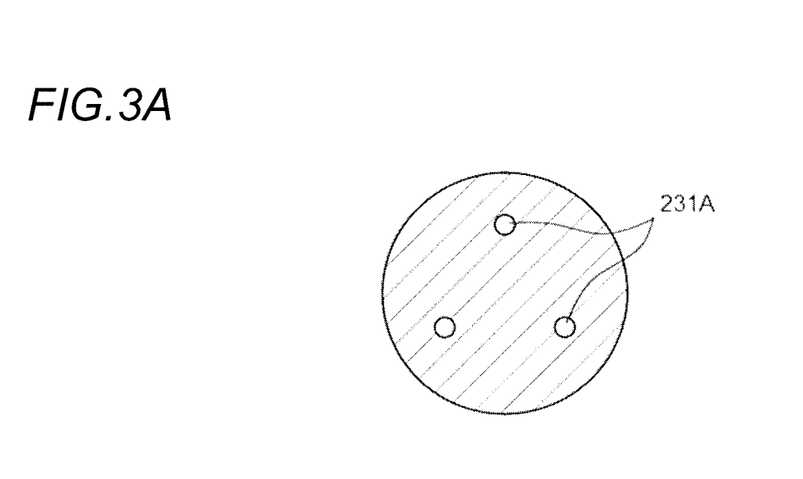
FIG. 3A is an enlarged view of a burner top, showing a modification of the source material ports formed in the burner provided in the production apparatus shown in FIG. 1.
Figure 3B:
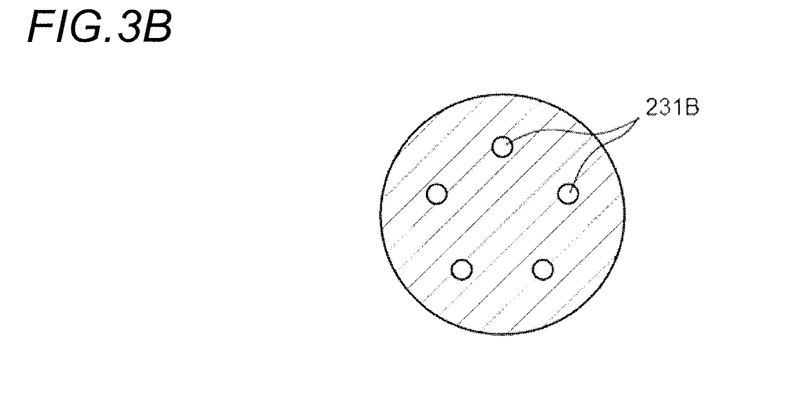
FIG. 3B is an enlarged view of a burner top, showing another modification of the source material ports formed in the burner provided in the production apparatus shown in FIG. 1.

The above-mentioned embodiment is so designed that two source material ports 231 are provided in the center part of the burner 222; however, the present invention is not limited to this example. For example, as shown in FIG. 3A, here may be employed a configuration where three source material ports 231A are provided at the position of each vertex of a regular triangle in the center part of the burner. As shown in FIG. 3B, another configuration may be employed here where five source material ports 231B are provided in the center part of the burner.

Figure 3C:
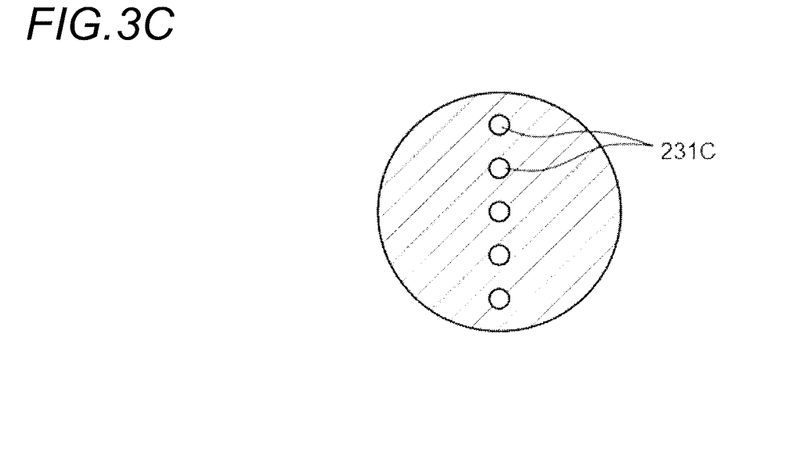
FIG. 3C is an enlarged view of a burner top, showing still another modification of the source material ports formed in the burner provided in the production apparatus shown in FIG. 1.
Figure 3D:
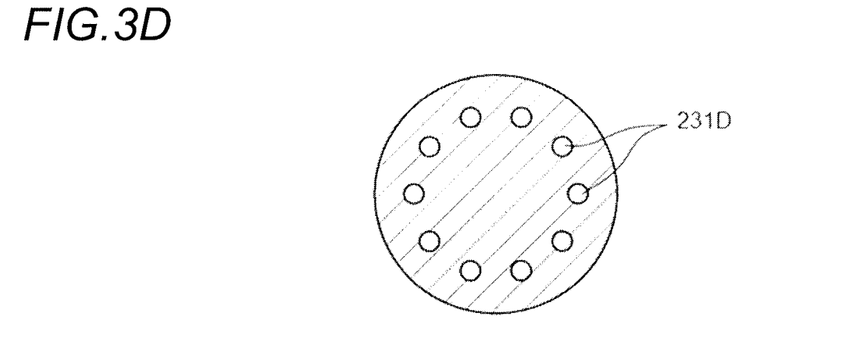
FIG. 3D is an enlarged view of a burner top, showing still another modification of the source material ports formed in the burner provided in the production apparatus shown in FIG. 1.

Further, as shown in FIG. 3C, still another configuration may be employed here where five source material ports 231C are aligned in line in the center part of the burner. As shown in FIG. 3D, still another configuration may be employed where 10 source material ports 231D are arranged at the position of each vertex of a regular decagon in the center part of the burner.

As in the above, providing three or more source material ports 231A, 231B, 231C and 231D per one burner 222 can further increase the glass source material yield for the glass particulate deposit M to be produced.

In this embodiment, the columnar burner 222 is used, to which, however, the present invention is not limited. For example, as in FIG. 4, a linear burner 322 may also be employed here.

Figure 4:
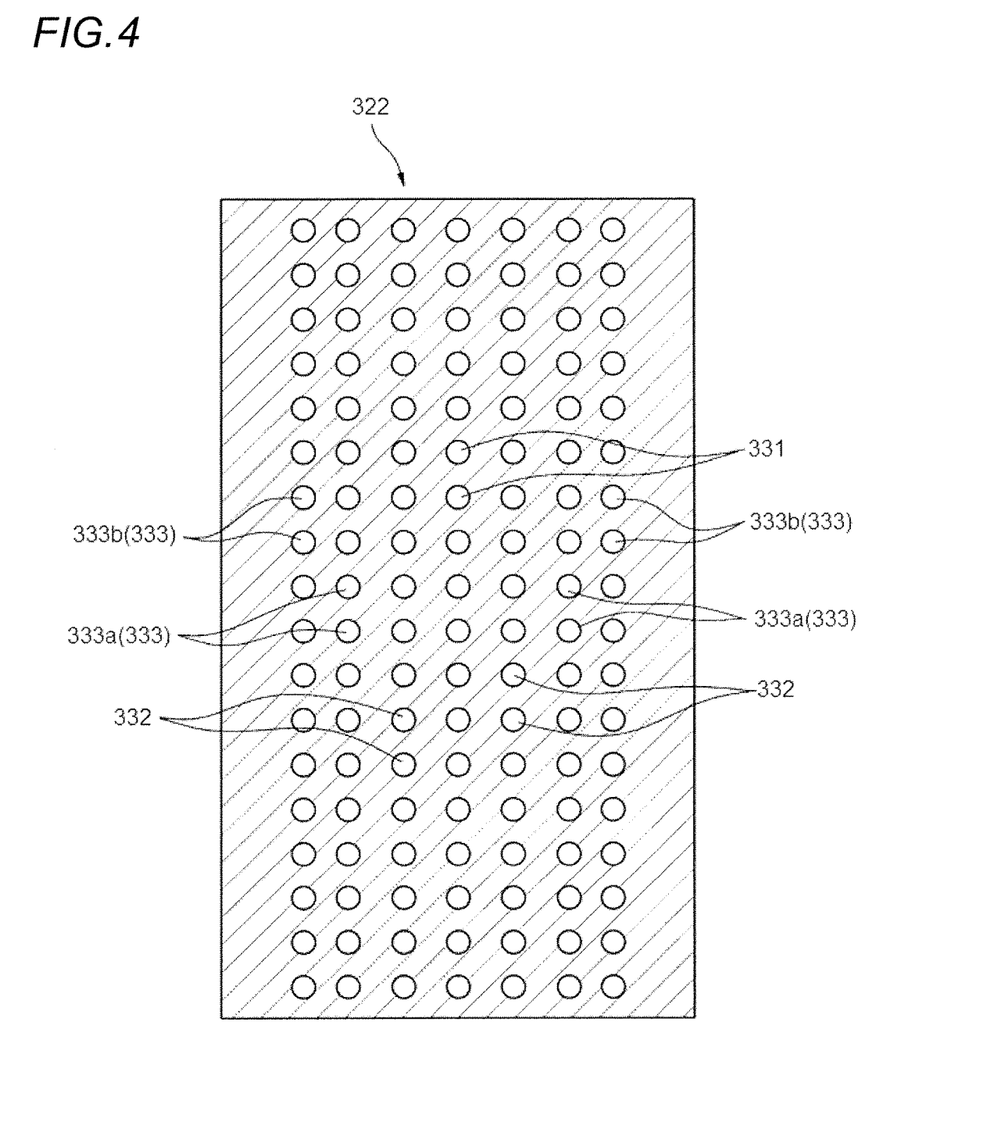
FIG. 4 is a plan view of the burner top of another example of the burner provided in the production apparatus shown in FIG. 1.

The linear burner 322 is so designed that, in the center part of the widthwise direction of the burner 322, multiple source material ports 331 are arranged in line in the lengthwise direction of the linear burner 322. On both sides of the source material ports 331 aligned in line, multiple seal gas ports 332 are arranged. Further, on the outer side of the seal gas ports 332, multiple combustion gas ports 333 are arranged in two lines. Like in the this embodiment, from the source material port 331 positioned in the center, for example, a siloxane such as typically OMCTS or the like is jetted out as the source material gas 123. From the seal gas port 332, for example, nitrogen ($N_2$) or argon (Ar) gas is supplied as a seal gas. From the inside ports 333a of the combustion gas ports 333 aligned in two lines, a combustible gas, hydrogen ($H_2$) is jetted out, and from the outside ports 333b, a co-combustion gas, oxygen ($O_2$) is jetted out.

According to the linear burner 322 shown in FIG. 4, like in the this embodiment, the source material gas 123 jetting out through each source material port 331 can be dispersed and put into the flame, and therefore, the reaction efficiency in the chemical reaction of the source material gas 123 to convert into $SiO_2$ can be thereby increased.

In this embodiment, the source material gas 123 is supplied via the MFC 125 to the burner 222 (or the linear burner 322) to form glass particles; however, the constitution of the present invention is not limited to the this embodiment.

In this embodiment, OMCTS is used as one example of a siloxane. Not limited to the case, any other siloxane such as DMCPS or the like can also realize the same effects as in this embodiment.

In addition, still other source materials than siloxane, such as $SiCl_4$ can also realize the same effect of increasing the glass source material yield.

EXAMPLES

Using the production apparatus shown in FIG. 1 and according to an OVD process, glass particles were deposited, or that is, a glass particulate deposit M was produced [deposition step].

The resulting glass particulate deposit M was heated in a mixed atmosphere of an inert gas and a chlorine gas at 1100° C., and then heated in a He atmosphere at 1550° C. for vitrification [vitrification step].

A pure quartz glass rod having a diameter of 36 mm and a length of 400 mm was used as the starting rod. OMCTS to be 5 g/min and $N_2$ to be 0.6 SLM were supplied to each one source material port of the burner. In Example 13, $N_2$ was not supplied to the source material port. As the flame forming gas, $H_2$ (flow rate: 20 to 70 SLM) and $O_2$ (flow rate: 30 to 70 SLM) were supplied; and as the burner seal gas, Ar (flow rate: 1 to 8 SLM) was supplied.

In the deposition step, the number of the source material ports per one burner, and the gas flow rate (m/s) from each source material port were varied suitably, and glass particles were deposited on the starting rod, and the glass source material yield (%) of the glass particulate deposit formed was evaluated. In each Example, the exit area of the source material ports is the same between the ports. The source material yield means the ratio by mass of the glass particles having actually deposited on the starting rod and the glass particulate deposit, relative to the $SiO_2$ mass in the case where OMCTS put into the burner changed 100% to quartz glass particles through chemical reaction. As the burner A, used was the columnar burner shown in any of FIG. 2B to FIG. 3D, and as the burner B, used was the linear burner shown in FIG. 4.

The results are shown in Table 1.

TABLE 1

| | Number of Source Material Ports | Gas Flow Rage (m/s) | $N_2$ introduction | Burner | Glass source material Yield (%) |
| --- | --- | --- | --- | --- | --- |
| Example 1 | 2 | 20.7 | yes | A | 73 |
| Example 2 | 3 | 20.7 | yes | A | 76 |
| Example 3 | 5 | 20.7 | yes | A | 79 |
| Example 4 | 10 | 20.7 | yes | A | 81 |
| Example 5 | 50 | 20.7 | yes | B | 82 |
| Example 6 | 100 | 20.7 | yes | B | 83 |
| Example 7 | 3 | 4.0 | yes | A | 56 |
| Example 8 | 3 | 8.0 | yes | A | 63 |
| Example 9 | 3 | 10.0 | yes | A | 66 |
| Example 10 | 3 | 30.1 | yes | A | 68 |
| Example 11 | 3 | 40.0 | yes | A | 62 |
| Example 12 | 3 | 60.0 | yes | A | 54 |
| Example 13 | 3 | 8.0 | no | A | 53 |
| Example 14 | 1 | 3.6 | yes | A | 38 |
| Example 15 | 1 | 68.6 | yes | A | 35 |

[Comparison of Examples of the Invention (Examples 1 and 7) and Comparative Example (Example 14)]

Example 1, an example of the present invention, verifies that, when the columnar burner A, in which the number of the source material ports per one burner is 2, is used while the gas flow rate from each source material port is controlled to be 20.7 (m/s) and $N_2$ is supplied to each source material port, then the glass source material yield is 73(%). Example 7 verifies that, when the columnar burner A, in which the number of the source material ports per one burner is 3, is used while the gas flow rate from each source material port is controlled to be 4.0 (m/s) and $N_2$ is supplied to each source material port, then the glass source material yield is 56(%).

On the other hand, in Example 14 that is a comparative example, where the burner A in which the number of the source material port per one burner is 1 is used and the gas flow rate from the source material port is 3.6 (m/s), the result is that the glass source material yield is only 38(%) even through $N_2$ is supplied to the source material port.

These results confirm that, when at least two glass source material ports are provided per one burner and when the flow rate of the glass source material jetting out through one source material port is controlled to be 4.0 (m/s) or more, then the glass source material yield is significantly increased.

[Regarding Examples of the Invention (Examples 1 to 6)]

In Examples 2 to 6 that are examples of the present invention, the number of the source material ports per one burner is larger than that in Example 1. In Example 2, used is the columnar burner A in which the number of the source material ports is 3; in Example 3, the number is 5; and in Example 4, the number is 10. In Example 5, used is the linear burner B in which the number of the source material ports is 50; and in Example 6, the number is 100. In Examples 2 to 6, the gas flow rate from the source material port is the same as in Example 1, and $N_2$ was supplied to each source material port like in Example 1.

As a result, it is confirmed that the glass source material yield increases with the increase in the number of the source material ports per one burner, as shown in Table 1.

[Regarding Examples of the Invention (Examples 2, and 7 to 12)]

In Examples 2 and 7 to 11 that are examples of the present invention, used was the columnar burner A in which the number of the source material ports per one burner is 3, and $N_2$ was supplied to each source material port. In every example, the gas flow rate from each source material port was varied. In Example 2, the flow rate was 20.7 (m/s); in Example 7, the flow rate was 4.0 (m/s); in Example 8, the flow rate was 8.0 (m/s); in Example 9, the flow rate was 10.0 (m/s); in Example 10, the flow rate was 30.1 (m/s); in Example 11, the flow rate was 40.0 (m/s); and in Example 12, the flow rate was 60.0 (m/s).

As shown in Table 1, the results confirm that, when the gas flow rate is 4.0 (m/s), the glass source material yield is 56(%), but with the increase in the gas flow, the glass source material yield increases, and when the gas flow rate is 20.7 (m/s), the glass source material yield is 76(%). When the gas flow rate is more than 20.7 (m/s), then the glass source material yield comes to lower, and when the gas flow rate is 60.0 (m/s), the glass source material yield is 54(%).

[Regarding Examples of the Invention (Examples 8, 13)]

In Examples 8 and 13 that are examples of the present invention, used was the columnar burner A in which the number of the source material ports per one burner is 3, and the gas flow rate from each source material port is 8.0 (m/s). In Example 8, $N_2$ was supplied to each source material port, but in Example 13, $N_2$ was not supplied.

As a result, as shown in Table 1, the glass source material yield in Example 8 is 63(%), and the glass source material source in Example 13 is 53(%). Accordingly, when the number of the source material ports and the gas flow rate are the same between the two, the glass source material yield is higher in the case where $N_2$ gas was mixed in the source material gas than in the case where $N_2$ gas was not mixed.

[Comparison Between Examples of the Invention (Examples 1 to 13) and Comparative Examples (Examples 14 and 15)]

In Examples 14 and 15 that are comparative examples, used was the columnar burner A in which the number of the source material port per one burner is 1, and $N_2$ was supplied to the source material port. In Example 14, the gas flow rate from the source material port is 3.6 (m/s), and in Example 15, the rate is 68.6 (m/s).

As a result, the glass source material yield in Example 14 is 38(%), and the glass source material source in Example 15 is 35(%). As shown in Table 1, the glass source material yield in Examples 1 to 13 that are examples of the present invention is much higher than the glass source material yield in Examples 14 and 15 that are comparative examples, from which, therefore, it is confirmed that, when the at least two glass source material ports are provided per one burner, and when the flow rate of the glass source material jetting out through one glass source material port is from 4 to 60 (m/s), preferably from 10 to 40 (m/s), more preferably from 15 to 30 (m/s), then the glass source material yield is significantly increased.

The invention claimed is:

1. A production method for a glass particulate deposit comprising:
a deposition step where a starting rod and a burner for production of glass particles are installed in a reactor, a glass source material is introduced into the burner, the glass source material is subjected to flame thermal decomposition in the flame formed by the burner to thereby form glass particles, and the formed glass particles are deposited on the starting rod to produce a glass particulate deposit,
wherein, in the deposition step, at least two ejecting ports are provided per one burner for ejecting the glass source material from the burner, and a gas flow velocity of the glass source material jetting out through one glass source material ejecting port is from 4 m/s to 60 m/s,
wherein the burner is a columnar burner at a center of which at least three of the ejecting ports, around of which a seal gas port is arranged, are arranged at a position of each vertex of a regular polygon with vertexes equal or less than ten,
the seal gas port is arranged to be substantially coaxial with a central axis of the columnar burner, and
a hydrogen gas port is arranged on an outer periphery of the seal gas port of the columnar burner,
wherein the burner is alternatively a linear burner in a center part of a widthwise direction of which the at least two ejecting ports, both sides of which a plurality of seal gas ports of the linear burner are arranged, are arranged linearly,
a plurality of combustion gas ports are arranged on an outer side of the seal gas ports of the linear burner.

2. The production method for a glass particulate deposit according to claim 1, wherein in the deposition step, three or more ejecting ports are provided per one burner.

3. The production method for a glass particulate deposit according to claim 1, wherein in the deposition step, five or more ejecting ports are provided per one burner.

4. The production method for a glass particulate deposit according to claim 1, wherein in the deposition step, the flow rate of the glass source material jetting out through one glass source material ejecting port is from 10 m/s to 40 m/s.

5. The production method for a glass particulate deposit according to claim 1, wherein in the deposition step, the flow rate of the glass source material jetting out through one glass source material ejecting port is from 15 m/s to 30 m/s.

6. The production method for a glass particulate deposit according to claim 1, wherein in the deposition step, the glass source material is supplied to each ejecting port in the form of a vapor thereof.

7. The production method for a glass particulate deposit according to claim 1, wherein in the deposition step, the glass source material is made to be a vapor thereof, and the vapor-state glass source material is mixed with an inert gas and supplied to each ejecting port.

8. The production method for a glass particulate deposit according to claim 1, wherein in the deposition step, the glass source material to be supplied to the burner is siloxane.

9. The production method for a glass particulate deposit according to claim 1, wherein in the deposition step, the glass source material to be supplied to the burner is octamethylcyclotetrasiloxane (OMCTS).

10. The production method for a glass particulate deposit according to claim 1, wherein no combustion gas port is arranged on an inner periphery of the seal gas port of the columnar burner.

11. A production method for a glass preform comprising:
a vitrification step where a glass particulate deposit is produced according to the production method for a glass particulate deposit of claim 1, and the thus-produced glass particulate deposit is heated to give a transparent glass preform.

12. The production method for a glass preform according to claim 11, wherein the deposition of the glass particles on the starting rod in the deposition step is implemented according to any of an OVD process, a VAD process or an MMD process.

* * * * *